Sept. 10, 1957 L. E. STANHOPE 2,805,518
GREENHOUSE
Filed Jan. 11, 1954 3 Sheets-Sheet 1

LAWRENCE E. STANHOPE
*INVENTOR.*
BY Robert C. Comstock
HIS ATTORNEY

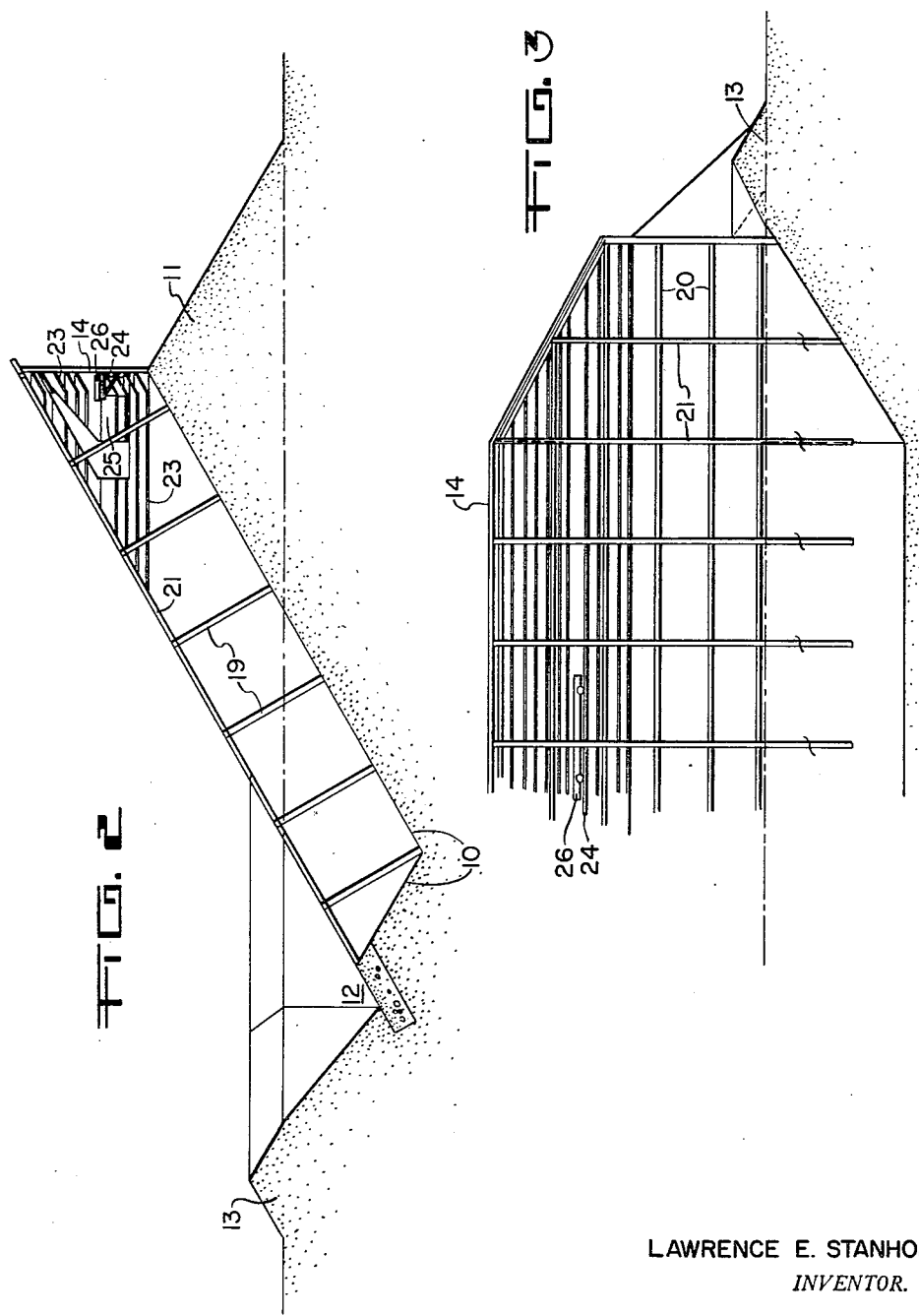

Sept. 10, 1957 L. E. STANHOPE 2,805,518
GREENHOUSE
Filed Jan. 11, 1954 3 Sheets-Sheet 3

LAWRENCE E. STANHOPE
*INVENTOR.*

BY Robert C. Comstock

HIS ATTORNEY

United States Patent Office 2,805,518
Patented Sept. 10, 1957

2,805,518

GREENHOUSE

Lawrence E. Stanhope, Hollywood, Calif.

Application January 11, 1954, Serial No. 403,185

3 Claims. (Cl. 47—17)

This invention relates to a greenhouse.

It is an object of my invention to provide a greenhouse which is capable of construction at far less cost than the conventional greenhouse and which provides better growing results. More particularly, it is an object of my invention to provide a greenhouse in which the entire growing area slants down toward the south so that the plants receive the maximum possible amount of sunlight for better growth.

It is a further object of my invention to provide such a greenhouse which is constructed by excavating a triangular section of dirt from the ground and then using the same dirt to form an adjacent inverted triangular section in order to provide a continuous growing area which slants down toward the south. The roof of my greenhouse is made parallel to the growing area instead of being peaked in the conventional manner, so that the rays of the sun strike the roof at substantially a right angle and are not dissipated as much by reflection and refraction.

It is another object of my invention to provide a greenhouse which uses about half the amount of glass customarily used in proportion to growing area, and in which the amount of glass used is substantially equal to the amount of growing area.

It is another object of my invention to provide a greenhouse in which the cost of heating is substantially less than with the conventional greenhouse.

A further object of my invention is to provide a greenhouse of the class described in which most of the weight of the glass roof is borne by the ground itself at the lower south end where the roof meets the ground rather than by the overhead supports, resulting in lower construction cost. Reducing the amount and size of the roof supports and eliminating all bracing of the roof supports in all directions reduces the shadow area within the greenhouse to improve the growing results.

With my greenhouse, the rays of the sun are applied to the growing area at their natural strength because the growing area is at a right angle to the rays of the sun. If the angle is other than a right angle, as in a conventional greenhouse, the rays of the sun are spread over a larger area of ground and are dissipated in power.

There is no loss of light in my greenhouse from the sun's rays entering one side and passing out the other side, as occurs in a conventional greenhouse when the sun is low. There is also a minimum amount of loss of light in my greenhouse from reflection and refraction, since the rays of the sun strike the roof and growing area at substantially a right angle.

With my greenhouse, no south wall is needed and only small walls are needed on the northeast and northwest sides.

In my greenhouse, the sun's rays shine through every square foot of glass, whereas in the conventional greenhouse the sun can shine through only half of the glass at any one time. In my greenhouse, every portion of the growing area receives as much or more sunshine than the best parts of the growing area in the conventional greenhouse because my growing area extends at a right angle to the rays of the sun.

My invention also comprises such other objects, advantages and capabilities as will later more fully appear and which are inherently possessed by my invention.

While I have shown in the accompanying drawings and described herein a preferred embodiment of my invention, it should be understood that the same is susceptible of modification and change without departing from the spirit of my invention.

Referring to the drawings,

Fig. 2 is a sectional view of the same taken on line 2—2 of Fig. 1;

Fig. 3 is a sectional view taken on line 3 of Fig. 1;

Figure 1:
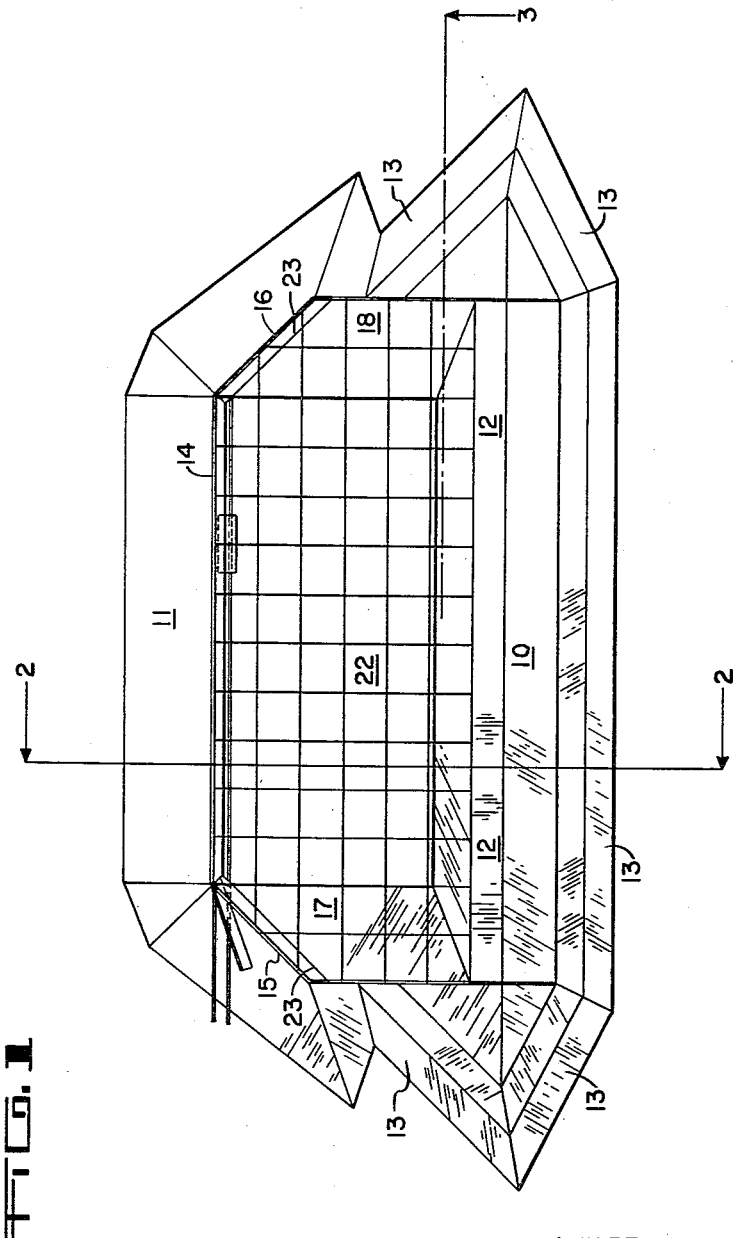
Fig. 1 is a top plan view of my greenhouse and the surrounding ground area forming a part thereof.
Figure 4:
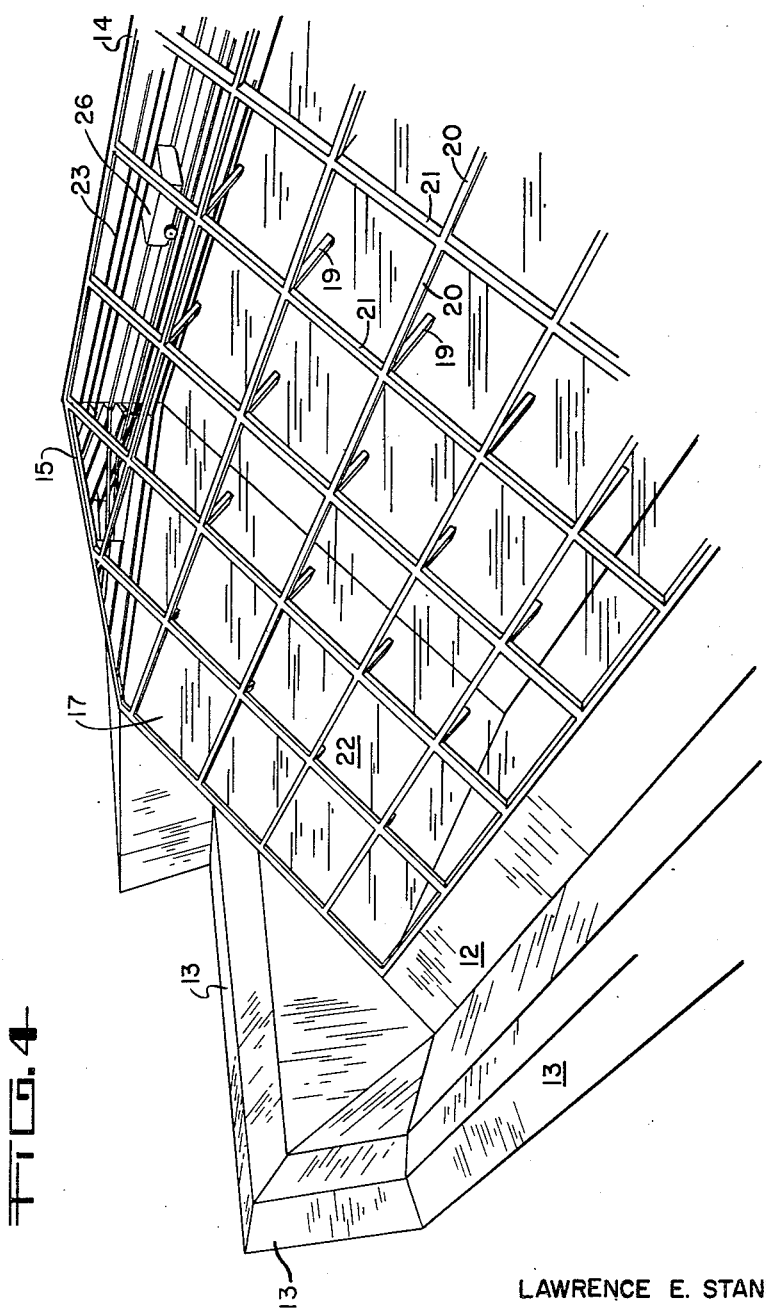
Fig. 4 is a top perspective view of one end of my greenhouse.

A preferred embodiment of my greenhouse which has been selected to illustrate my invention is constructed by starting with any piece of ground which is assumed to be substantially level. A portion of the selected ground area is first excavated to form a substantially triangular excavation 10 extending east and west. The earth which is removed from the excavation 10 is piled on the north bank of excavation 10 to form an adjacent inverted triangular section 11. The north banks of excavation 10 and triangular section 11 are made even with each other to provide a continuous surface which is the basic growing area of my greenhouse. The growing area is slanted down toward the south at any desired angle from a slight angle to a steep one, depending on the angle of the sun's rays during the winter months in the particular latitude where the greenhouse is constructed, it being preferred that the growing area be substantially at a right angle to the rays of the sun during the winer months. Thus, in a northern latitude, the slope of the growing area would be greater than in a southern latitude, since the sun does not rise as high above the horizon in the more northern latitude.

A portion of the south wall of excavation 10 is excavated to form a gutter 12, the north bank of which is parallel to the growing area. Gutter 12 carries off rain water and snow from the adjacent roof of my greenhouse. The top of the south wall of excavation 10 is surrounded by a levee 13, which forms an upright triangle and which is preferably formed of dirt. Levee 13 prevents any flood waters from entering the portion of my greenhouse which is beneath the normal ground level.

Extending upwardly from adjacent the top of inverted triangular section 11 is a north wall 14, which is constructed of lumber or other suitable material and which extends in an upward direction at a right angle to the normal ground level. Extending from the ends of north wall 14 and also at an upward right angle to the ground level are northeast and northwest walls 15 and 16. The center portion of inverted triangular section 11 extends directly east and west, but its end portions extend southeast and southwest respectively to provide support beneath northeast and northwest walls 15 and 16. The tops of northeast and northwest walls 15 and 16 slant downwardly to meet the top of the ends of triangular section 11.

Adjacent the sides of the basic growing area of my greenhouse are smaller east and west growing areas 17 and 18 which are bounded by northeast and northwest walls 15 and 16. The east and west growing areas 17 and 18 are slanted upwardly with respect to the basic growing area and terminate at the sides of the roof.

Extending upwardly at a right angle from the basic growing area are a plurality of vertical studs 19. The bottom ends of studs 19 are imbedded in supporting blocks of cement or other suitable material in the ground of the basic growing area. The upper ends of studs 19 are attached to a plurality of cross braces 20, which extend longitudinally east and west over the growing area. The studs 19 preferably extend at a right angle to the basic growing area so that they are parallel to the sun's rays and provide a minimum amount of shadow over the growing area. This construction also has the advantage that the studs 19 are attached to cross braces 20 at a right angle, to simplify their connection.

It should be understood, of course, that studs 19 may extend vertically with respect to the true ground level or that any other desired angle may be used. The construction suggested is merely illustrative of a method of supporting the roof of my greenhouse.

Extending transversely to cross braces 20 in a north and south direction are a plurality of cross arms 21. While the cross arms 21 are shown in the drawing as conventional, they may be positioned about six inches beneath the cross braces 20 and constructed in pairs, with one member of each pair being positioned on each side of studs 19. This provides a support for carrying an overhead trolley, which may be necessary to transport plants where the growing area is too steep for walking. Steps or terraces may also be provided for this purpose.

Mounted on the top of cross braces 20 is a glass roof 22, which is preferably formed of a plurality of small panes of glass in the conventional manner. The roof 22 extends substantially parallel to the basic growing area and is bounded on the south by the top of the north bank of gutter 12, on the north by the top of north wall 14, and on the northeast by the top of northeast wall 15 and on the northwest by the top of northwest wall 16. On the east and west, roof 22 is bounded by the top edges of the east and west growing areas 17 and 18.

It may be noted that substantially the entire weight of roof 22 is carried by cross arms 21 down to the ground at the point where roof 22 meets the top of the north wall of gutter 12. This weight is supported by a block of concrete, which preferably comprises the entire north wall of gutter 12. It should be understood, of course, that individual concrete blocks may be placed at the end of cross arms 21 or that other suitable supporting means may be used.

With this construction, no diagonal bracing is needed in any direction. Since the weight of the roof is primarily carried directly by the ground at the south end of the roof, a minimum amount of supports are required, resulting in a minimum amount of shadows being cast over the growing area and a saving in materials and labor.

Extending across substantially the entire length of north wall 14, northeast wall 15 and northwest wall 16 are a plurality of parallel shelves 23 which extend in the same plane as the basic growing area. Small plants in pots or growing boxes may be placed on shelves 23 so that they grow parallel to the rays of the sun. The use of shelves 23 for growing purposes increases the effective growing area of my greenhouse.

Extending adjacent the base of north wall 14 for the entire length thereof is a pair of parallel tracks 24 which extend out through a door 25 in northeast wall 15 and down to the ground level. One or more small cars 26 travel on tracks 24 and carry plants into and out of my greenhouse. The cars may be propelled by hand or motor power.

In use, the basic growing area of my greenhouse may be employed to grow any type of plant which can be accommodated. The distance between roof 22 and the basic growing area may be varied at the time my greenhouse is constructed to accommodate tall or short plants. With the addition of heat, my greenhouse serves as a hot house. The east and west growing areas 17 and 18 where the distance between the growing area and roof 22 may be used for smaller plants such as tomatoes. The shelves 23 on north wall 14 may be used for small plants.

The heating of my greenhouse may be accomplished more efficiently and economically than is the case with the conventional greenhouse. The heat sources are preferably placed more toward the lower level of my greenhouse so that the heat rises naturally toward the opposite or higher end. It may be noted that in conventional peaked roof greenhouse a large amount of heat is concentrated and wasted in the triangular area beneath the peak of the roof far above the plants. In my greenhouse, no heat is wasted and the cost of heating is substantially less.

There is a further saving in heating costs due to the fact that the glass area of the greenhouse is reduced. In the conventional greenhouse, the walls are constructed of glass, through which heat escapes. With my greenhouse, there are no glass walls, resulting in a substantial reduction in heat loss.

With regard to north wall 14, it should be understood that instead of being at a right angle to the ground, it may extend at a right angle to the growing area or at any angle therebetween. It may also be constructed as a double wall with recesses for growing strawberries and other small berry plants.

Additional greenhouses constructed in accordance with my invention can be placed parallel to each other with a minimum amount of spacing between, the spacing being only sufficient to avoid the casting of a shadow by one greenhouse over the adjacent greenhouse.

The construction materials which are used to build my greenhouse may be varied as desired, and lumber, angle iron or pipe may be used.

I claim:

1. A greenhouse comprising an excavation in the earth, said excavation being triangular in cross section and extending lengthwise from east to west, a mound of earth triangular in cross section and inverted with respect to said excavation, said mound extending along substantially the entire north top edge of said excavation, the south wall of said triangular mound being continuous with the north wall of said excavation to form a continuous growing area of earth extending from the top of said mound to the bottom of said excavation, said growing area slanting downwardly toward the south and extending at an angle substantially perpendicular to the rays of the sun, and a north wall extending upwardly from adjacent the top of said mound perpendicularly to the earth, a roof attached at one end to the top edge of said north wall and at its opposite end to the earth adjacent the top edge of the south wall of said excavation.

2. The subject matter of claim 1, and east and west growing areas disposed adjacent to and on opposite sides of said first named growing area, said east and west growing areas extending from the edges of said first named growing area upwardly to the opposite sides of said roof.

3. The subject matter of claim 1, and plurality of studs extending upwardly at a right angle to said growing area and roof, said studs being mounted in the ground at their lower ends and attached to said roof at their upper ends.

References Cited in the file of this patent

UNITED STATES PATENTS

| 1,718,215 | Burrage | June 25, 1929 |
| 2,639,550 | McKee | May 26, 1953 |
| 2,777,253 | Bensin | Jan. 15, 1957 |

FOREIGN PATENTS

| 5,314 | France | 1897 |
| 404,757 | France | Oct. 28, 1909 |
| 153,487 | Great Britain | Nov. 11, 1920 |